United States Patent
Masamura

(10) Patent No.: US 11,445,118 B2
(45) Date of Patent: Sep. 13, 2022

(54) IMAGE PICKUP APPARATUS, AN IMAGE PROCESSING METHOD AND A NON-TRANSITORY COMPUTER-READABLE MEDIUM

(71) Applicant: CANON KABUSHIKI KAISHA, Tokyo (JP)

(72) Inventor: Takuya Masamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/109,927

(22) Filed: Dec. 2, 2020

(65) Prior Publication Data
US 2021/0092304 A1   Mar. 25, 2021

Related U.S. Application Data

(63) Continuation of application No. 16/594,358, filed on Oct. 7, 2019, now Pat. No. 10,887,524, which is a
(Continued)

(30) Foreign Application Priority Data

Dec. 21, 2016   (JP) .............................. JP2016-248205

(51) Int. Cl.
*H04N 5/232*   (2006.01)
*H04N 5/265*   (2006.01)
(Continued)

(52) U.S. Cl.
CPC ......... *H04N 5/232935* (2018.08); *G06T 5/50* (2013.01); *G06T 7/11* (2017.01);
(Continued)

(58) Field of Classification Search
CPC ........... H04N 5/232935; H04N 5/2628; H04N 5/232127; H04N 5/232; H04N 5/232945;
(Continued)

(56) References Cited

U.S. PATENT DOCUMENTS 5,187,571 A * 2/1993 Braun .................... H04N 5/265
                                                         348/39
2015/0097988 A1* 4/2015 Nonaka ................ H04N 5/2624
                                                         348/239
(Continued)

FOREIGN PATENT DOCUMENTS

JP    2011-7872 A    1/2011
JP    2014-137704 A  7/2014

*Primary Examiner* — Gevell V Selby
(74) *Attorney, Agent, or Firm* — Canon U.S.A., Inc. I.P. Division

(57) ABSTRACT

Image pickup apparatuses, control methods and storage mediums for use therewith are provided herein. At least one image pickup apparatus includes: a display unit that displays an image generated by an imaging unit; an image processing unit that extracts in-focus areas from a plurality of images different in in-focus position that are generated by the imaging unit and that composites the extracted areas; and a control unit. The control unit acquires, out of image magnifications corresponding to the plurality of images different in in-focus position, a reference image magnification, and the image processing unit corrects the image to be displayed on the display unit based on an image magnification corresponding to the image to be displayed on the display unit and the reference image magnification.

11 Claims, 9 Drawing Sheets

Related U.S. Application Data continuation of application No. 15/838,135, filed on Dec. 11, 2016.

(51) Int. Cl.
| | | |
|---|---|---|
| *G06T 7/11* | (2017.01) | |
| *H04N 5/262* | (2006.01) | |
| *G06T 5/50* | (2006.01) | |
| *H04N 9/04* | (2006.01) | |

(52) U.S. Cl.
CPC ......... *H04N 5/232* (2013.01); *H04N 5/23296* (2013.01); *H04N 5/232127* (2018.08); *H04N 5/232945* (2018.08); *H04N 5/265* (2013.01); *H04N 5/2628* (2013.01); *H04N 9/045* (2013.01); *G06T 2207/10052* (2013.01)

(58) Field of Classification Search
CPC .... H04N 9/045; H04N 5/23296; H04N 5/265; G06T 5/50; G06T 7/11; G06T 2207/10052

See application file for complete search history.

(56) References Cited

U.S. PATENT DOCUMENTS

2015/0326798 A1* 11/2015 Muto ................ H04N 5/23229
　　　　　　　　　　　　　　　　　　　　348/239
2018/0176475 A1*  6/2018 Masamura ............ H04N 5/232

* cited by examiner

IMAGE PICKUP APPARATUS, AN IMAGE PROCESSING METHOD AND A NON-TRANSITORY COMPUTER-READABLE MEDIUM

CROSS-REFERENCE TO RELATED APPLICATIONS

This application is a Continuation, and claims the benefit, of U.S. patent application Ser. No. 16/594,358, presently pending and filed on Oct. 7, 2019, which is a continuation, and claims the benefit, of U.S. patent application Ser. No. 15/838,135, filed on Dec. 11, 2017 and issued as U.S. Pat. No. 10,484,612 on Nov. 19, 2019, and claims the benefit of, and priority to, Japanese Patent Application No. 2016-248205, filed Dec. 21, 2016, which applications are hereby incorporated by reference herein in their entireties.

BACKGROUND OF THE INVENTION

Field of the Invention

The present disclosure relates to one or more embodiments of a display on an image pickup apparatus, in particular to the display of images captured at different in-focus positions.

Description of the Related Art

In the case of capturing images of a plurality of subjects at different distances from an image pickup apparatus such as a digital camera, or in the case of capturing an image of a subject that is long in a depth direction, only part of the subject may come into focus due to insufficient depth of field in an imaging optical system. To solve this problem, Japanese Patent Laid-Open No. 2015-216532 discloses a technique for generating a composite image being in-focus in the entire imaging area by capturing a plurality of images at different in-focus positions, extracting in-focus areas from the images, and compositing the in-focus areas into one image.

However, when the foregoing image capturing is performed using live-view display of an image pickup apparatus such as a digital camera, field angles of the captured images may change with alterations of in-focus position due to the changing lens feed amount or the like. To generate a composite image, with reference to the field angle of the captured image with the narrowest field angle, the other captured images need cut-out processing. Accordingly, the field angle of the live view image being captured may be different from the field angle of the composite image.

Japanese Patent Laid-Open No. 2015-231058 discloses a method for generating image data for verification through simple pre-imaging and image processing, prior to real imaging.

However, according to the method described in Japanese Patent Laid-Open No. 2015-231058, it is necessary to perform the pre-imaging prior to the real imaging, which causes trouble to the person in charge of imaging and lengthens the entire time of imaging operation.

SUMMARY OF THE INVENTION

At least one object of the present disclosure is to provide at least one embodiment of an image pickup apparatus that allows capturing of a plurality of images different in in-focus position and verification of the field angle of a composite image with convenience.

The present disclosure provides at least one embodiment of an image pickup apparatus including: an imaging unit; a display unit that displays an image generated by the imaging unit; an image processing unit that extracts in-focus areas from a plurality of images different in in-focus position that are generated by the imaging unit and that composites the extracted areas; and a control unit. The control unit corrects the image to be displayed on the display unit based on, out of image magnifications corresponding to the plurality of images different in in-focus position, a reference image magnification.

According to other aspects of the present disclosure, one or more additional image pickup apparatuses, one or more image pickup methods and one or more storage mediums for use therewith are discussed herein. Further features of the present disclosure will become apparent from the following description of exemplary embodiments (with reference to the attached drawings).

DESCRIPTION OF THE EMBODIMENTS

Preferred embodiments of the present disclosure will be described in detail with reference to the attached drawings.

First Embodiment

Figure 1:
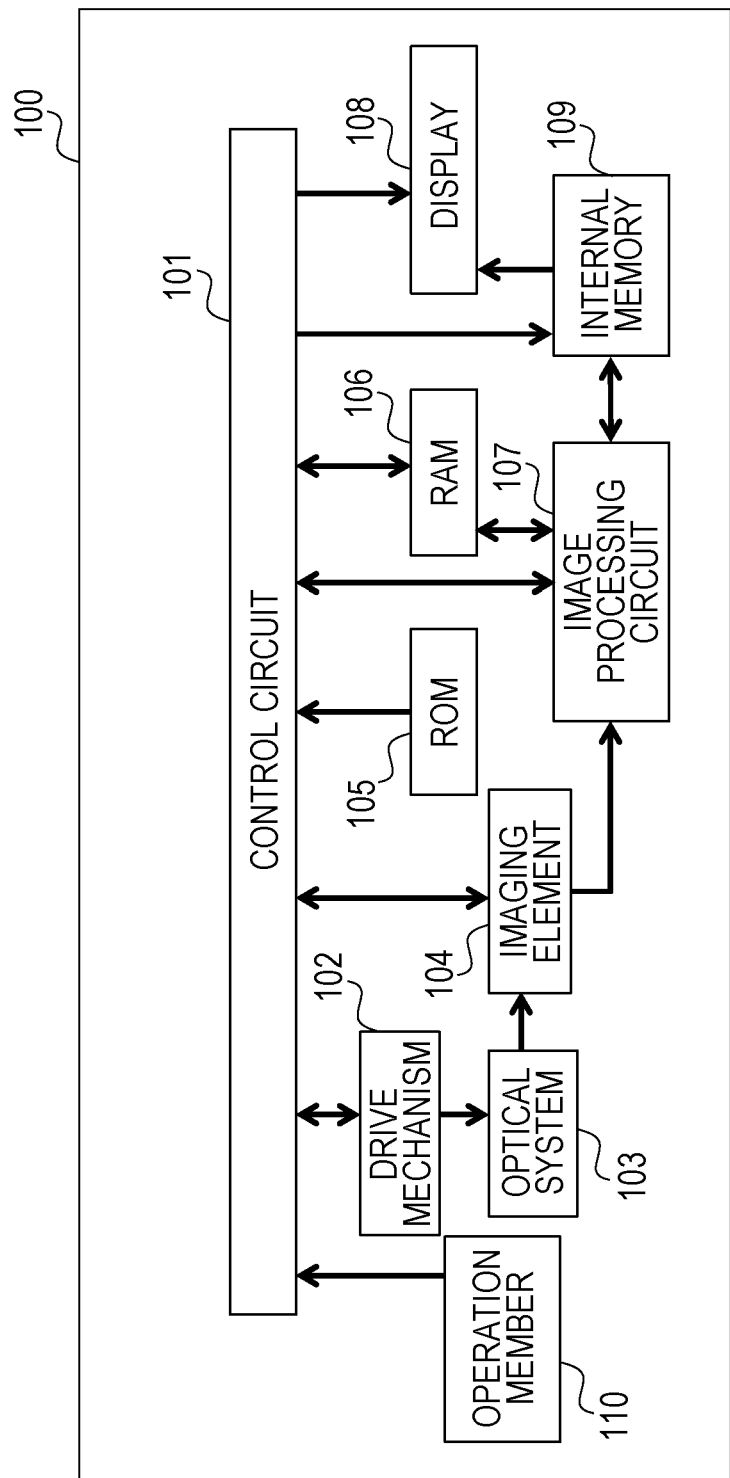
FIG. 1 is a block diagram of structure of a digital camera according to embodiments of the present disclosure.

FIG. 1 is a block diagram of structure of a digital camera according to a first embodiment of the present disclosure.

A control circuit 101 is, for example, a signal processor such as a CPU or an MPU, that reads in advance programs from a ROM 105 described later to control the respective components of a digital camera 100. For example, as described later, the control circuit 101 provides commands for starting and terminating of image capturing to an imaging element 104 described later. In addition, the control circuit 101 provides commands for image processing to an image processing circuit 107 described later based on the programs stored in the ROM 105. The commands from the user are input into the digital camera 100 by an operation member 110 described later and transmitted to the respective components of the digital camera 100 via the control circuit 101.

A drive mechanism 102 is formed from a motor or the like and causes mechanical operation of an optical system 103 described later, under the commands from the control circuit 101. For example, under a command from the control circuit 101, the drive mechanism 102 moves the position of a focus lens included in the optical system 103 to adjust the focal length of the optical system 103.

The optical system 103 is formed from a zoom lens, a focus lens, a diaphragm, and the like. The diaphragm is a mechanism for adjusting the amount of transmitted light. The in-focus position can be changed by changing the position of the focus lens.

The imaging element 104 is a photoelectric conversion element that performs photoelectric conversion of an incident optical signal into an electric signal. For example, the imaging element 104 may be a CCD or CMOS sensor, or the like.

The ROM 105 is a read-only volatile memory as a recording medium that stores not only operation programs for the blocks included in the digital camera 100 but also parameters and the like necessary for operation of the blocks. The RAM 106 is a rewritable volatile memory that is used as a temporary storage area for data output during the operation of the blocks included in the digital camera 100.

The image processing circuit 107 performs various kinds of image processing, such as white balance adjustment, color interpolation, and filtering, on the image output from the imaging element 104 or the data of the image signal recorded in an internal memory 109 described later. In addition, the image processing circuit 107 performs compression processing on the data of the image signal captured by the imaging element 104 under standards such as JPEG.

The image processing circuit 107 is formed from an integrated circuit (ASIC) in which circuits performing specific processes are united. Alternatively, the control circuit 101 may perform processing according to the programs read from the ROM 105 so that the control circuit 101 also performs some or all of the functions of the image processing circuit 107. When the control circuit 101 also performs all the functions of the image processing circuit 107, it is not necessary to have the image processing circuit 107 as hardware.

A display 108 is a liquid crystal display or an organic EL display that displays images temporarily saved in the RAM 106, or images saved in the internal memory 109 described later, or setting screens of the digital camera 100. The display 108 can reflect the image acquired by the imaging element 104 as a display image in real time, and present the image in live view display.

The internal memory 109 is a place that records the images captured by the imaging element 104, the images processed by the image processing circuit 107, and information on the in-focus positions at the time of image capturing. Instead of the internal memory, a memory card or the like may be used.

The operation member 110 includes buttons, switches, keys, mode dial in the digital camera 100, or a touch panel also used as the display 108, for example. The commands input by the user using the operation member 110 reach the control circuit 101, and the control circuit 101 controls the operations of the blocks in response to the commands.

Figure 2:
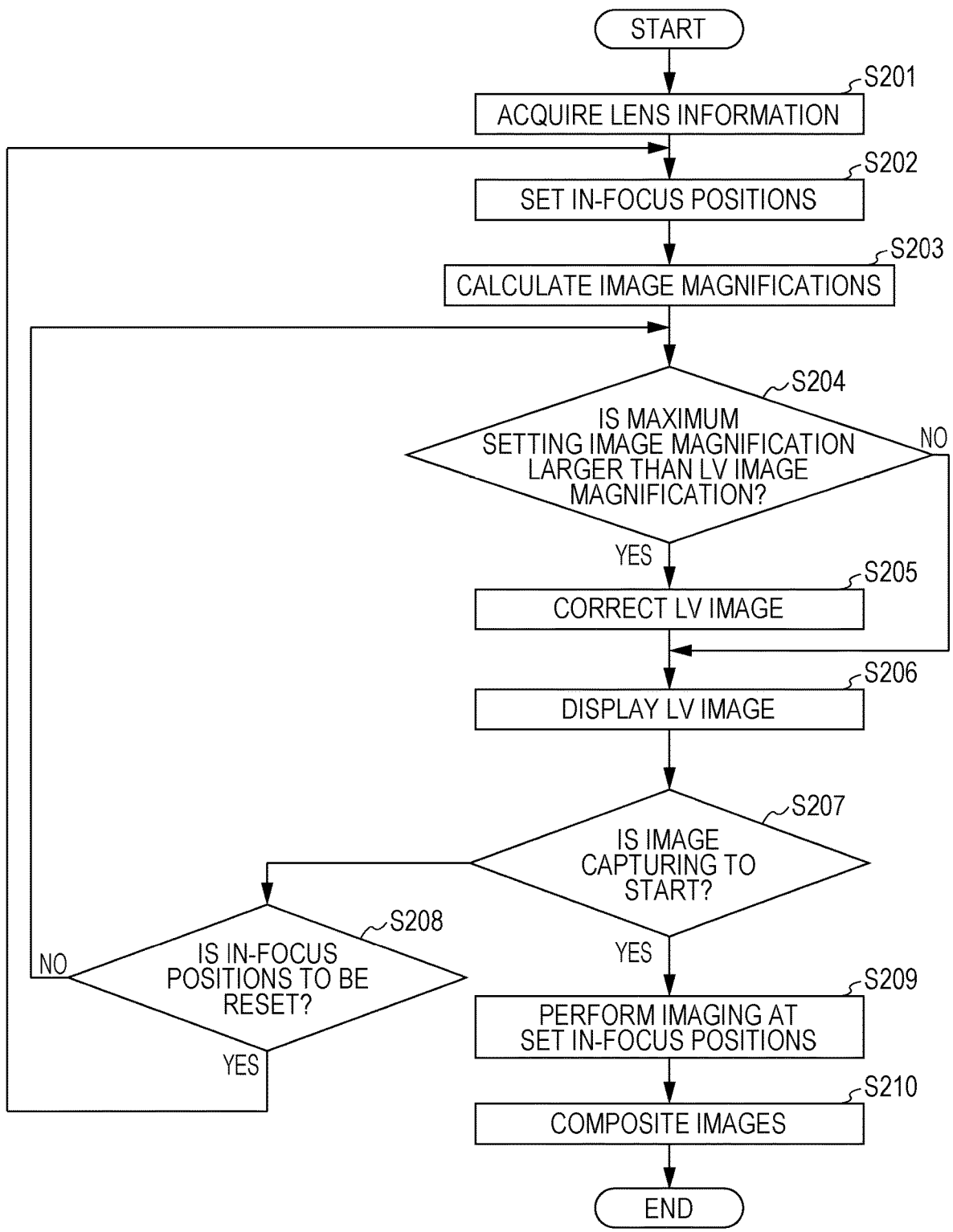
FIG. 2 is a flowchart for describing at least a first embodiment.

FIG. 2 is a flowchart for describing the first embodiment.

At step S201, the control circuit 101 acquires lens information. For example, in a digital camera incapable of lens replacement, the lens information is saved in advance in the ROM 105, and the control circuit 101 acquires the lens information at S201. Alternatively, in a digital camera capable of lens replacement, the control circuit 101 reads the type of the lens through a mount provided on the optical system 103 or the like. The information by lens type is saved in advance in the ROM 105, and the control circuit 101 compares the information with the read lens type, and reads the relevant lens information from the ROM 105. The lens information here refers to unique information on the lens, such as a relationship between an in-focus position and an image magnification in the case of using a lens described later.

In the first embodiment, the control circuit 101 reads a function indicating the relationship between an in-focus position and an image magnification included in the lens information. The image magnification and the field angle of an image are in inverse proportion to each other. Accordingly, the control circuit 101 can also acquire the relationship between an in-focus position and a field angle from the function indicating the relationship between the in-focus position and the image magnification. In general, the function indicating the relationship between the in-focus position and the image magnification is uniquely determined by the type of the lens, having a monotonic change. The image magnification here refers to the ratio of the size of a subject image formed by the imaging element to the size of the actual subject.

Figure 3:
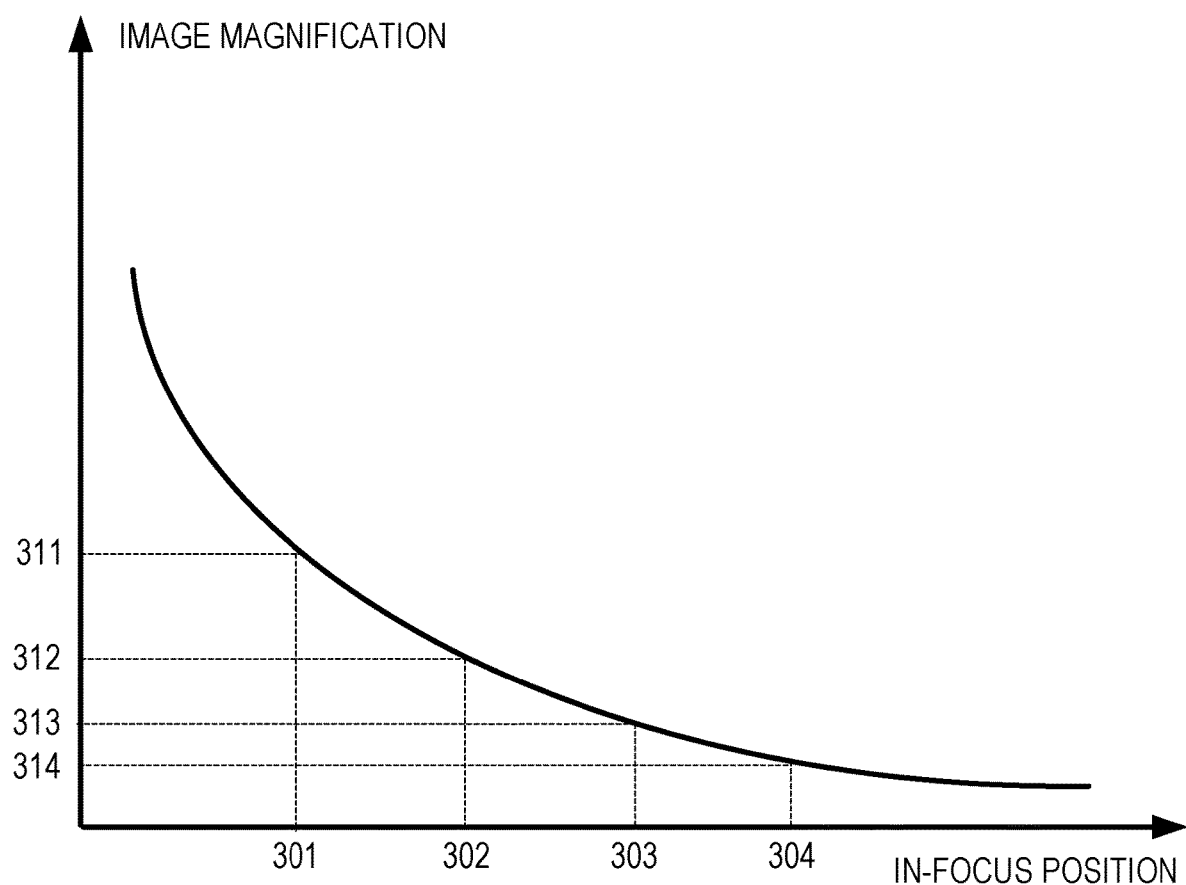
FIG. 3 is a diagram for describing a function indicating a relationship between an in-focus position and an image magnification in at least the first embodiment.

FIG. 3 is a diagram for describing a function indicating the relationship between the in-focus position and the image magnification in the first embodiment. The function described in FIG. 3 has a monotonic decrease with respect to the image magnification.

At step S202, the control circuit 101 sets a plurality of in-focus positions. For example, the user sets a focus area using the touch panel, and the optical system 103 measures an in-focus position corresponding to the focus area. The control circuit 101 sets a predetermined number of in-focus positions in front of and behind the measured in-focus position. The control circuit 101 preferably sets the distance between the adjacent in-focus positions such that the end portions of their field depths slightly overlap.

At step S203, the control circuit 101 calculates the image magnifications. At step 203, the control circuit 101 uses the function indicating the relationship between the in-focus position and the image magnification acquired at step S201 to calculate the image magnifications corresponding to the in-focus positions set at step S202. For example, as illustrated in FIG. 3, the control circuit 101 sets in-focus positions 301 to 304 at step S202. According to the function illustrated in FIG. 3, it can be understood that, when the optical system 103 obtains focus at the in-focus positions 301 to 304, the image magnifications of the images captured by the imaging element 104 are respectively image magnifications 311 to 314.

At step S204, the control circuit 101 compares a maximum setting image magnification to a live view image magnification (hereinafter, called LV image magnification). The maximum setting image magnification here refers to the highest image magnification calculated at step S203, which are included in a reference image magnification. The LV image magnification refers to the image magnification corresponding to the in-focus position set for live view display on the display 108.

When determining at step S204 that the maximum setting image magnification is higher than the LV image magnification, the control circuit 101 moves onto step S205, and when not determining so, the control circuit 101 moves onto step S206.

Figure 4A:
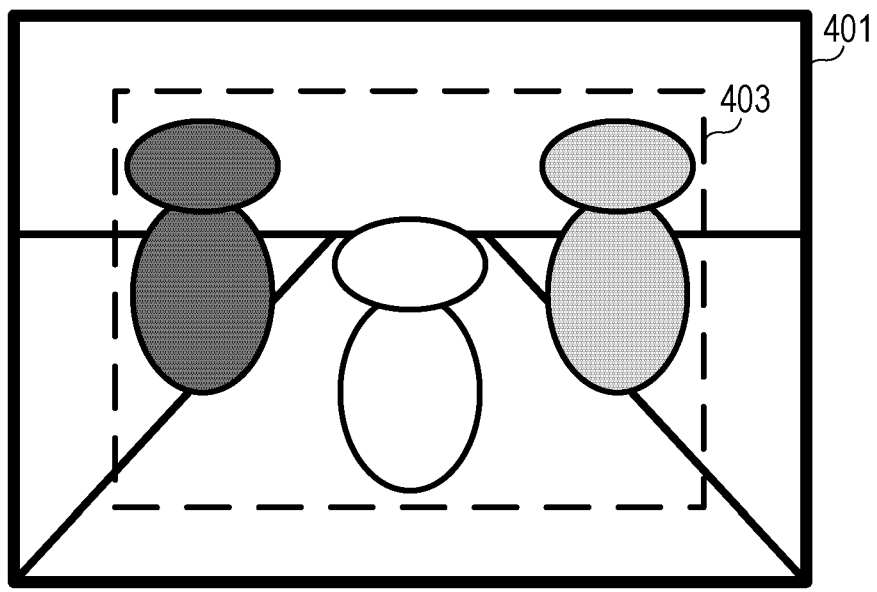
FIGS. 4A and 4B are diagrams for describing a maximum setting image magnification and an LV image magnification in at least the first embodiment.
Figure 4B:
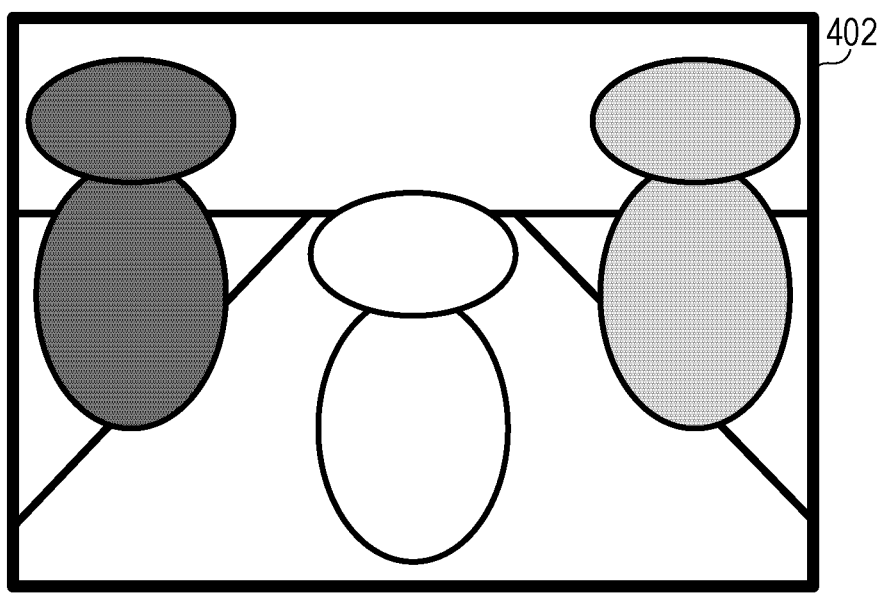

FIGS. 4A and 4B are diagrams for describing the maximum setting image magnification and the LV image magnification in the first embodiment. FIG. 4A illustrates the field angle of an image with the LV image magnification, and FIG. 4B illustrates the field angle of an image with the maximum setting image magnification. The field angle of an image 401 illustrated in FIG. 4A is wider than the field angle of an image 402 illustrated in FIG. 4B, and the field angle of a portion in a frame 403 illustrated in FIG. 4A is equivalent to the field angle of the image 402. Therefore, in an attempt of compositing the image 401 and the image 402, the control circuit 101 needs to abandon the portion of the image 401 outside the frame 403, and the generated composite image would have no portion outside the frame 403. The display 108 has the image 401 with the portion outside the frame 403 on the live view display, whereas the display 108 displays the composite image without that portion. To solve this problem, when the control circuit 101 determines that the maximum setting image magnification is higher than the LV image magnification, the live view image is corrected so that the display 108 does not have the portion of the image 401 outside the frame 403 on live view display. Specifically, at step S205, the image processing circuit 107 cuts out the portion within the frame 403 of the image 401 illustrated in FIG. 4A and enlarges the cut-out portion to the original size of the image 401.

At step S206, the display 108 displays the live view image. When the image processing circuit 107 made live view correction at step S205, at step S206 the display 108 has the post-correction image as display image on live view display, not the pre-correction image.

At step S207, the control circuit 101 determines whether there is an instruction for starting imaging from, for example, the user operating a button on the operation member 110. When there is the instruction for starting imaging, the control circuit 101 moves onto step S207. When there is no instruction for starting imaging, the control circuit 101 moves onto step S208. At step S208, the control circuit 101 determines whether to reset the in-focus positions. When the in-focus positions need resetting, the control circuit 101 returns to step S202. When the in-focus positions need no resetting, the control circuit 101 returns to step S204.

For example, when the digital camera 100 performs imaging in a tracking mode in which the in-focus position is changed in real time according to the position of a subject, the in-focus position also needs to be changed in real time. In such a case, when there is no instruction for starting imaging at step S207, the control circuit 101 returns to step S202 to set the in-focus positions once more. Meanwhile, in the case of setting first in-focus positions at predetermined distances from the digital camera 100 at step S202 and not changing the settings after that, there is no need to reset the in-focus positions. Therefore, in such a case, when there is no instruction for starting imaging at step S207, the control circuit 101 returns to step S204, not step S202.

At step S209, the imaging element 104 performs real imaging at the plurality of in-focus positions set at step S202.

At step S210, the image processing circuit 107 composites the images captured by the real imaging at step S209. An example of the method for compositing the images is as briefly described below. The image processing circuit 107 creates a composition MAP using contrast values obtained from the images. Specifically, out of the plurality of images, the composition ratio of the image with the highest contrast value is set to 100%, and the composition ratio of the other images is set to 0%, in respective noticed areas or pixels. When the composition ratio changes from 0% to 100% (or from 100% to 0%) between the adjacent pixels, the composition boundary becomes unnaturally prominent. Accordingly, a low-pass filter with a predetermined number of pixels (tap numbers) is applied to the composition MAP to process the composition MAP such that the composition ratio does not sharply change between the adjacent pixels. Alternatively, the composition MAP may be created based on the contrast values of the images in the noticed area or pixel such that the images with higher contrast values have higher composition ratios.

In this way, according to the first embodiment, it is possible to correct live view display during imaging with consideration given to the field angle of a composite image, and display the field view corresponding to the field angle of the composite image to the user during imaging.

In the description of step S202, a predetermined number of in-focus positions is set with reference to the in-focus position in the focus area set by the user through the touch panel, but one or more embodiments of the present disclosure are not limited to this. Alternatively, the area occupied by the subject with the reference in-focus position may be identified from the image and a plurality of in-focus positions may be set based on range information in this area.

Figure 5A:
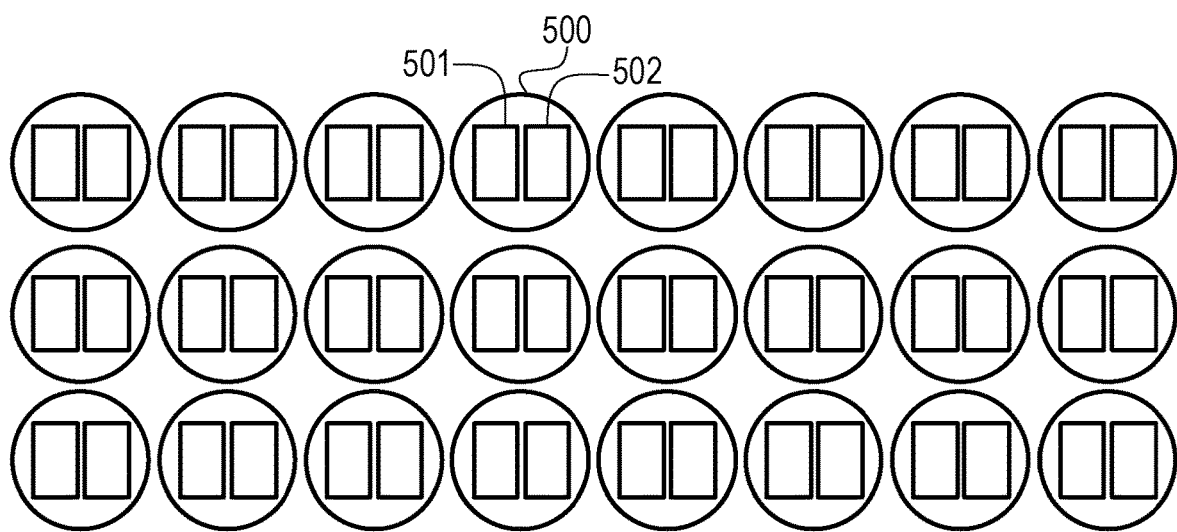
FIGS. 5A and 5B are diagrams for describing examples of an array of sensors included in imaging elements capable of acquiring range information on a subject.
Figure 5B:
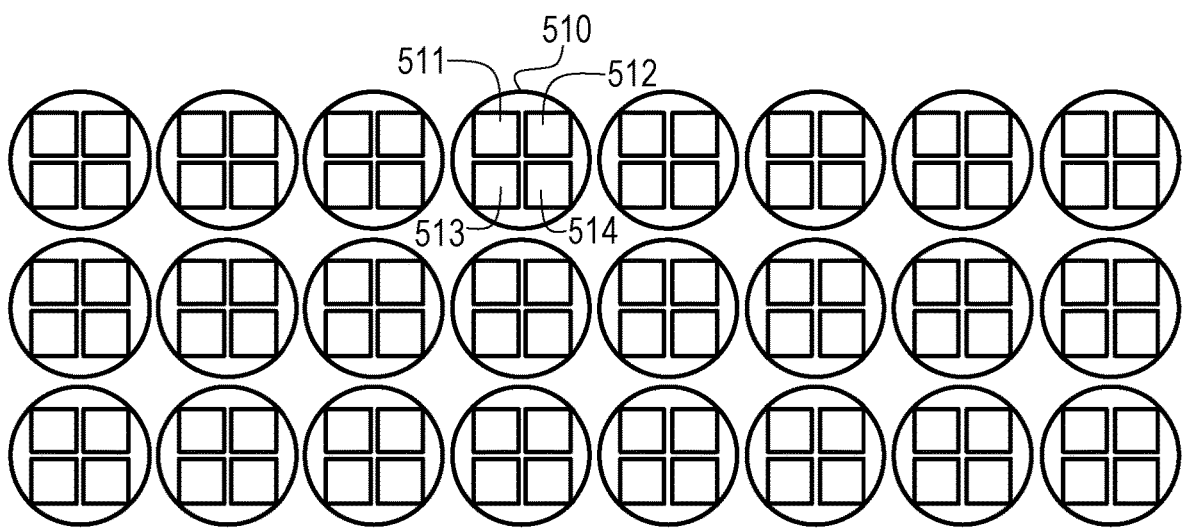

FIGS. 5A and 5B are diagrams for describing an example of an array of sensors included in the imaging element 104 capable of acquiring range information on the subject. FIG. 5A illustrates a structure in which each pixel 500 has two photoelectric conversion units 501 and 502 capable of independently reading optical signals. The number of photoelectric conversion units included in each pixel is not limited to two, but may be three or more. For example, FIG. 5B illustrates a structure in which each pixel 510 has four photoelectric conversion units 511 to 514. The following description is based on the structure in which one pixel has two photoelectric conversion units.

Figure 6:
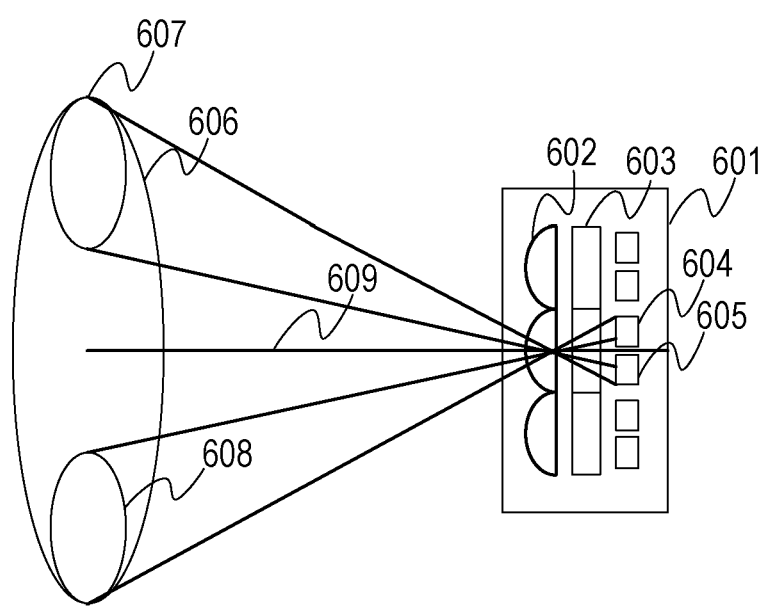
FIG. 6 is a diagram for describing incidence of optical signals on a pixel having a plurality of photoelectric conversion units.

FIG. 6 is a diagram for describing the state of incidence of optical signals on a pixel having a plurality of photoelectric conversion units.

Referring to FIG. 6, a pixel array 601 includes micro lenses 602, color filters 603, and photoelectric conversion units 604 and 605. The photoelectric conversion units 604 and 605 belong to the same pixel and correspond to the common micro lens 602 and the common color filter 603. FIG. 6 is a top view of the digital camera 100 in which the two photoelectric conversion units 604 and 605 corresponding to one pixel are aligned abreast. Out of light beams emitted from an exit pupil 606, with an optical axis 609 as a boundary, the upper light beam (equivalent to light beam from an area 607) enters the photoelectric conversion unit 605, and the lower light beam (equivalent to light beam from an area 608) enters the photoelectric conversion unit 604. That is, the photoelectric conversion units 604 and 605 receive light from different areas of the exit pupil in the imaging lens. When the signal received by the photoelectric conversion unit 604 is designated as image A and the signal received by the photoelectric conversion unit 605 as image B, it is possible to calculate a defocus amount based on the phase difference between the image A and the image B, and acquire range information. In particular, when pixels having two photoelectric conversion units are disposed on the entire imaging element 104, the imaging element 104 can acquire range information at an arbitrary place of the subject.

Figure 7A:
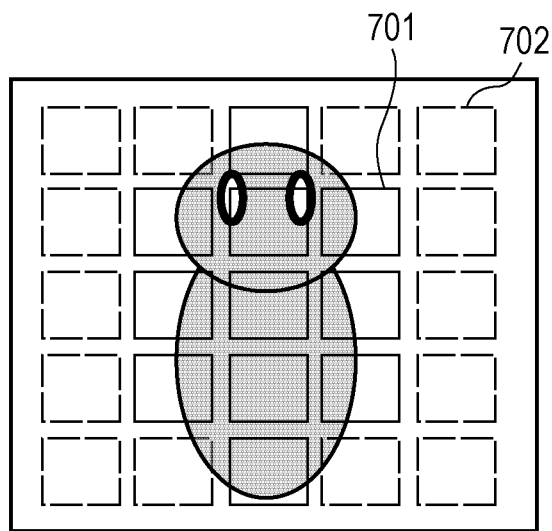
FIGS. 7A, 7B, and 7C are diagrams for describing a method for acquiring range information on a subject by using pixels having a plurality of photoelectric conversion units.
Figure 7B:
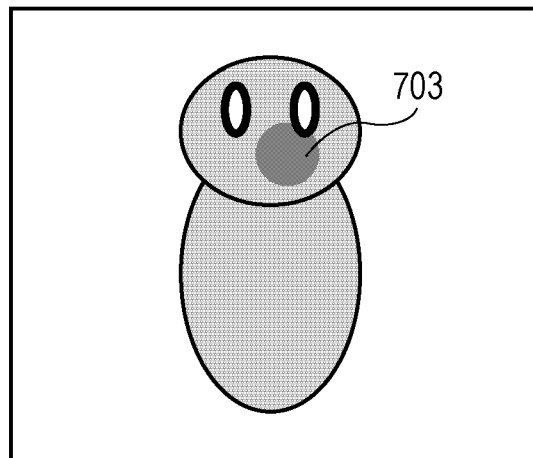
Figure 7C:
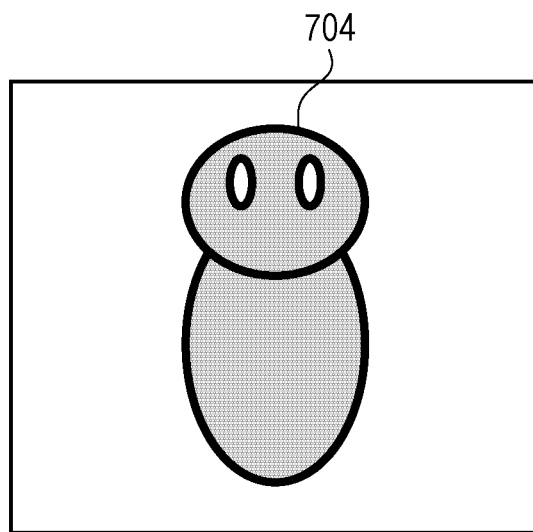

FIG. 7 is a diagram for describing a method for acquiring range information on a subject by using pixels having a plurality of photoelectric conversion units. FIG. 7A illustrates 25 pixels in total in a 5×5 array on a screen for visibility, but actual pixels are smaller in size and larger in number. The pixels superimposed on the subject such as a pixel 701 are depicted by solid lines, and the other pixels by dotted lines like a pixel 702. The range information on the entire subject can be acquired by acquiring range information on all the solid-line pixels as described above.

Hereinafter, setting of the in-focus positions at step S202 in the first embodiment will be described. The user performs a touch operation using the touch panel included in the operation member 110 to specify an area 703 as a portion of the subject. When the area 703 is selected by this touch operation, the control circuit 101 detects an entire area 704 of the subject to which the area 703 belongs. For example, the control circuit 101 analyzes color information in the image through the image processing circuit 107 to detect the subject from the color information. Alternatively, the control circuit 101 may acquire edge information and range information in the image through the image processing circuit 107 and detect the entire area 704 of the subject based on the information.

Subsequently, as described above, the control circuit 101 acquires range information on the pixels superimposed on the entire area 704 of the subject such as the pixel 701 illustrated in FIG. 7A. The control circuit 101 sets an in-focus position at the longest distance from the subject as well as an in-focus position at the shortest distance from the subject, in the acquired range information. Then, the control circuit 101 sets some in-focus positions between the two in-focus positions by a predetermined method such as equal spacing.

Second Embodiment

In a second embodiment, unlike the first embodiment, the control circuit 101 does not automatically set the in-focus positions but the user manually moves the in-focus position for imaging. Hereinafter, the second embodiment will be described. The descriptions of the same components as those of the first embodiment will not be repeated.

Figure 8:
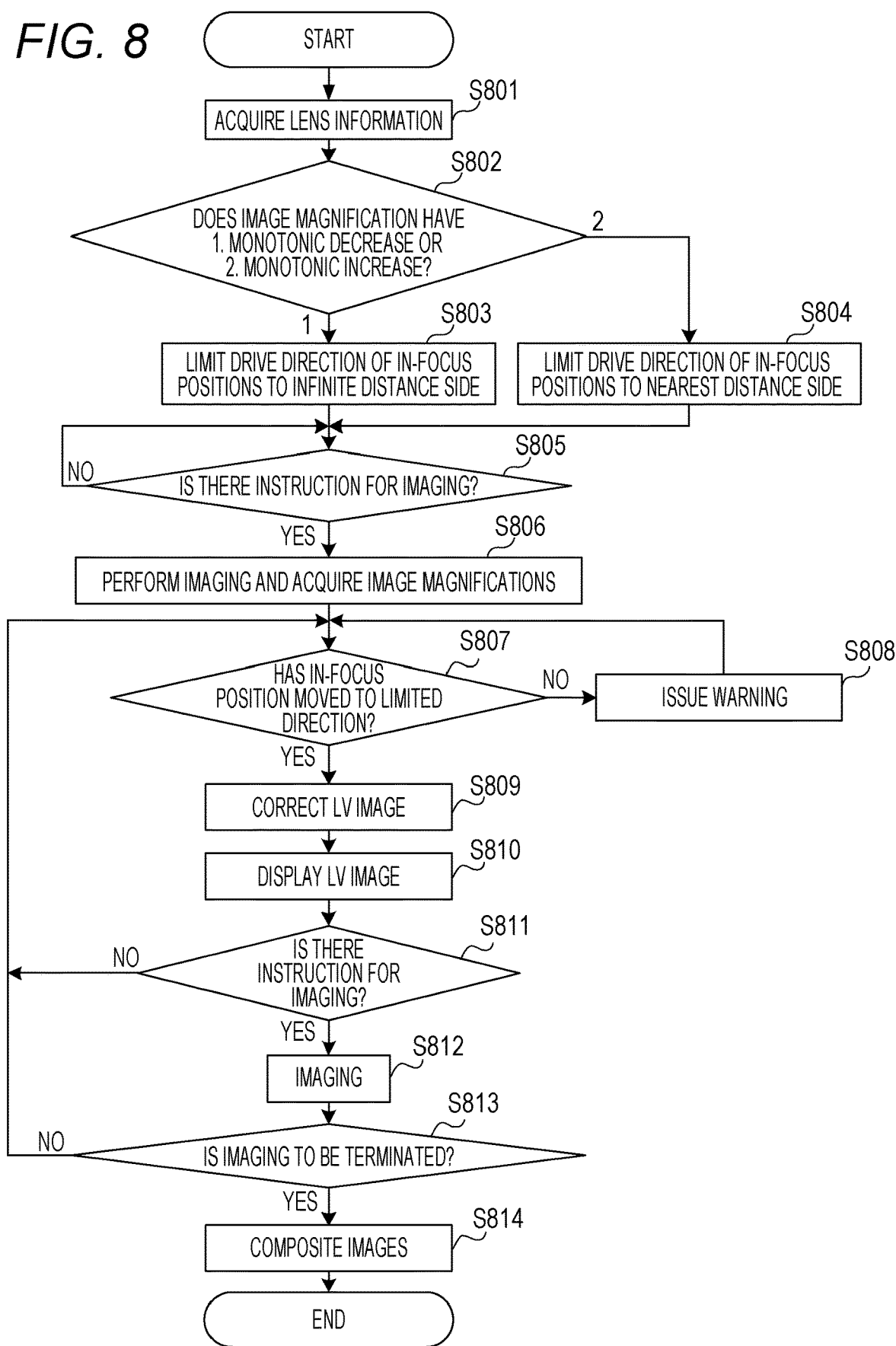
FIG. 8 is a flowchart for describing at least a second embodiment.

FIG. 8 is a flowchart for describing the second embodiment.

At step S801, as at step S802 of the first embodiment, the control circuit 101 acquires lens information.

Figure 9A:
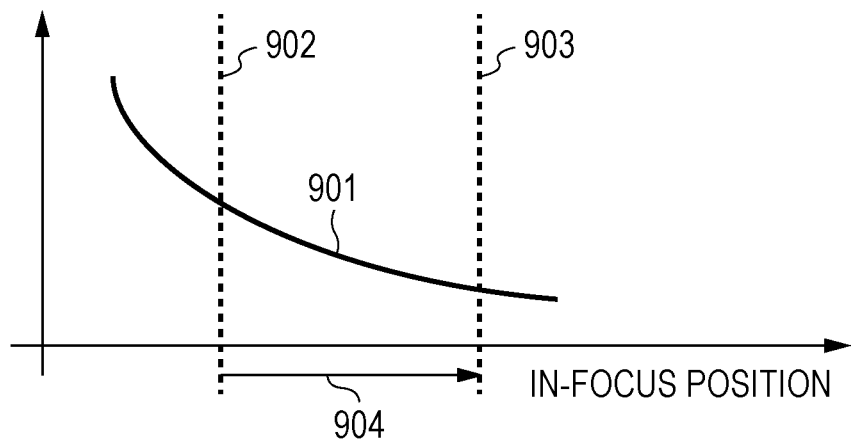
FIG. 9A is a diagram illustrating a monotonic decrease of an image magnification.
Figure 9B:
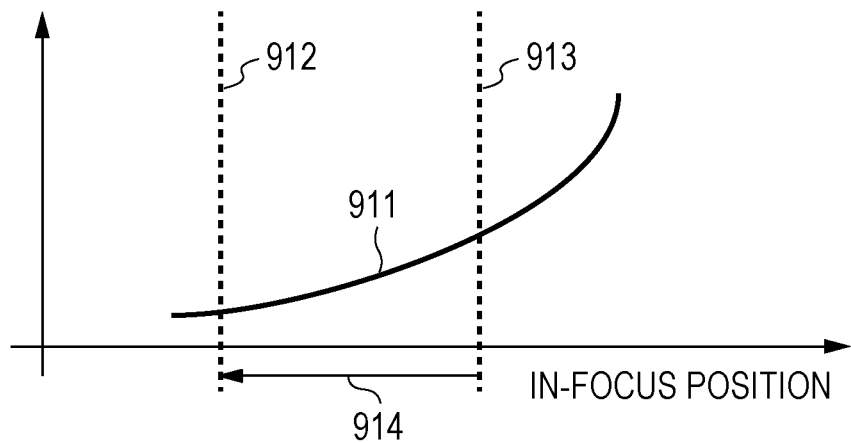
FIG. 9B is a diagram illustrating a monotonic increase of an image magnification.

At step S802, the control circuit 101 determines whether the image magnification has a monotonic decrease or a monotonic increase. FIG. 9A is a diagram illustrating the state in which the image magnification in the second embodiment has a monotonic decrease, and FIG. 9B is a diagram illustrating the state in which the image magnification in the second embodiment has a monotonic increase. The control circuit 101 analyzes a function indicating the relationship between an image magnification and an in-focus position based on the lens information acquired at step S801. When the image magnification decreases constantly as the in-focus position becomes more distant as shown by a curve 901 in FIG. 9A, the control circuit 101 determines that the image magnification has a monotonic decrease. In contrast, when the image magnification increases constantly as the in-focus position becomes more distant as shown by a curve 911 in FIG. 9B, the control circuit 101 determines that the image magnification has a monotonic increase. When determining at step S802 that the image magnification has the monotonic decrease, the control circuit 101 moves onto step S803. When determining at step S802 that the image magnification has the monotonic increase, the control circuit 101 moves onto S804.

At step S803, the control circuit 101 restricts the drive direction of the in-focus position to the infinite distance side. That is, after the start of the real imaging at step S806 described later, the control circuit 101 restricts the movement of the in-focus position to the direction from an in-focus position 902 to an in-focus position 903 along arrow 904 in FIG. 9A. When the in-focus position moves onto the opposite direction of the arrow 904, the control circuit 101 issues a warning as described later.

At step S804, the control circuit 101 restricts the drive direction of the in-focus position to the closest distance side. That is, after the start of the real imaging, the control circuit 101 restricts the movement of the in-focus position to the direction from an in-focus position 913 to an in-focus position 912 along arrow 914 in FIG. 9B. When the in-focus position moves to the opposite direction of the arrow 914, the control circuit 101 issues a warning as described later.

The user adjusts the in-focus position of the optical system 103 and moves the position to the initial in-focus position. The user can set the initial in-focus position to an arbitrary position while watching the blurring level of the subject in live view or through an electronic viewfinder. At step S805, the control circuit 101 determines whether there is an instruction for first real imaging from the user. When there is the instruction for real imaging, the control circuit 101 moves onto step S806. When there is no instruction, the control circuit 101 enters a standby state at step S805.

At step S806, the imaging element 104 performs real imaging at the initial in-focus position, and the control circuit 101 acquires the image magnification corresponding to the in-focus position. The image magnification acquired by the control circuit 101 is equivalent to "the maximum set image magnification" in the first embodiment.

At step S807, the control circuit 101 determines whether the user is moving the in-focus position in the direction restricted at step S803 or S804. For example, in the case of determining at step S802 that the image magnification has a monotonic decrease and restricting at step S803 the drive direction of the in-focus position to the infinite distance side, when the in-focus position is being moved to the closest distance side, the display 108 displays a warning at step S807. Alternatively, the display 108 displays a live view image at step S808 and displays a warning on the displayed live view image. Still alternatively, the digital camera 100 may issue a warning such as a beep or the like. In contrast, when the in-focus position is being moved to the infinite distance side at step S807, the control circuit 101 moves onto step S809.

At step S809, the image processing circuit 107 corrects the live view image. By restricting the moving direction of the in-focus position at step S807, the field angle of the live view image is greater than the field angle of the image captured by the real imaging at the initial in-focus position. Accordingly, as at step S205 in the first embodiment, the image processing circuit 107 performs enlargement processing to cut and discard the portion not included in the displayed composite image. The specific method will not be described here because it is the same as that at step S205.

At step S810, the display 108 displays the live view image after the correction by the image processing circuit 107 at step S809.

At step S811, the control circuit 101 determines whether there is an instruction for real imaging from the user with the operation member 110. For example, the control circuit 101 determines whether the user pressed a button in the operation member 110. When there is the instruction for real imaging, the control circuit 101 moves onto step S812 where the imaging element 104 performs imaging. When there is no instruction for real imaging, the control circuit 101 returns to step S807.

After the real imaging by the imaging element 104 at step S812, the control circuit 101 determines at step S813 whether there is an instruction for terminating the imaging. In this step, for example, the control circuit 101 determines whether the user has pressed any button other than the button pressed at step S811. Alternatively, the control circuit 101 determines whether the user has provided the instruction for terminating the imaging through the touch panel. Still alternatively, the user may have determined the number of images to be captured so that the control circuit 101 determines at step S813 whether images equal in number to the predetermined number of images to be captured have been captured by the real imaging. When the predetermined number of images to be captured has been reached, the control circuit 101 determines that the imaging is to be terminated. When it is determined at Step S813 that the imaging is to be terminated, the control circuit 101 moves onto step S814. When it is determined that the imaging is not to be terminated, the control circuit 101 returns to step S807.

At step 814, the image processing circuit 107 composites a plurality of images captured by the real imaging by the imaging element 104 at steps S806 and S812. The method for compositing the images is the same as that at step S209.

The foregoing description is merely for an example of the second embodiment and the second embodiment can be modified in various manners. For example, at step S808, the control circuit 101 may issue a warning not only when the in-focus position is being moved to a direction other than the restricted direction but also when the in-focus position has moved outside the depth of the subject at an adjacent in-focus position. Alternatively, when there are pixels 500 as illustrated in FIG. 5 of the second embodiment, the control circuit 101 may perform subject detection as in the second embodiment, and when the in-focus position falls outside the range of subject distance in the optical axis direction, the control circuit 101 may issue a warning.

According to the second embodiment, when the user manually performs real imaging at a plurality of in-focus positions, the field angle equivalent to the composite image can be displayed for the user at the initial in-focus position by restricting the movement direction of the in-focus position.

Other Embodiments

The foregoing embodiments are carried out by a digital camera but one or more embodiments of the present disclosure are not limited to a digital camera. For example, one or more embodiments of the present disclosure may be carried out by a mobile device with an internal imaging element or a network camera capable of image capturing.

One or more embodiments of the present disclosure may be carried out by providing programs for executing one or more functions in the foregoing embodiments to a system or an apparatus via a network or a storage medium, and reading and executing the programs by one or more processors in the system or the apparatus. Alternatively, one or more embodiments of the present disclosure may be carried out by a circuit (for example, ASIC) performing the one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed embodiments. The scope of the following claims is to be accorded the broadest interpretation so as to encompass all such modifications and equivalent structures and functions.

What is claimed is:

1. An image processing method comprising:
   displaying a plurality of images obtained by picking up in different in-focus positions, the plurality of images having the different in-focus positions being used for generating a composite image; and
   performing a control of displaying of the obtained images corresponding to the different in-focus positions before generating the composite image such that each display indicates a portion corresponding to a field angle of the composite image.

2. The image processing method according to claim 1, further comprising:
   generating the composite image using the plurality of images having the different in-focus positions.

3. The image processing method according to claim 2, wherein in the generating, the composite image is generated by compositing the plurality of images in respective notice areas with the highest contrast among the plurality of images.

4. The image processing method according to claim 3, wherein a depth field of the composite image is deeper than the depth field of any of the plurality of images.

5. The image processing method according to claim 1, wherein a field angle of at least one of the plurality of images is different from a field angle of the composite image.

6. The image processing method according to claim 1, wherein field angles of the plurality of images are different according to the in-focus positions of the plurality of images.

7. The image processing method according to claim 6, wherein the field angle of the composite image is equal to a narrowest field angle among the field angles of the plurality of images.

8. The image processing method according to claim 6, further comprising:

acquiring a reference field angle out of the field angles of the plurality of images as the field angle corresponding to the field angle of the composite image, wherein in the performing the control of displaying, the each display is performed in accordance with the reference angle.

9. The image processing method according to claim 8, wherein in the acquiring the reference field angle, optical system information relating to an optical system used for picking up the plurality of images is acquired and the reference field angle in accordance with the optical system information and the in-focus position is acquired.

10. The image processing method according to claim 1, wherein in the performing the control of displaying, the portion corresponding to the field angle of the composite image is cut off from the obtained image and the cut-off portion is displayed.

11. A non-transitory computer-readable medium for causing a computer to execute an image processing method, the image processing method comprising:

displaying a plurality of images obtained by picking up in different in-focus positions, the plurality of images having the different in-focus positions being used for generating a composite image; and performing a control of displaying of the obtained images corresponding to the different in-focus positions before generating the composite image such that each display indicates a portion corresponding to a field angle of the composite image.

\* \* \* \* \*